United States Patent

[11] 3,569,697

[72] Inventor David E. McCurdy
 Fort Collins, Colo.
[21] Appl. No. 798,284
[22] Filed Feb. 11, 1969
[45] Patented Mar. 9, 1971
[73] Assignee The United States of America as represented by the United States Atomic Energy Commission

[54] THERMOLUMINESCENT DOSIMETER FOR PROVIDING A TOTAL RADIATION MEASURE OF RADIO-ACTIVITY IN A FLUID MEDIUM TO WHICH THE DOSIMETER IS EXPOSED
3 Claims, 3 Drawing Figs.
[52] U.S. Cl. ................................................. 250/43.5,
 250/44, 250/71.5, 250/83
[51] Int. Cl. ..................................................... G01t 1/11,
 G01t 1/20
[50] Field of Search .............................................. 250/43.5
 (R), 44, 71.5, 83 (CD), 83.6 (FT)

[56] References Cited
UNITED STATES PATENTS
2,972,678 2/1961 Anton ........................... 250/43.5R
3,291,986 12/1966 Lamb ........................... 250/43.5RX
3,471,699 10/1969 McCall ........................... 250/83CD Primary Examiner—James W. Lawrence
Assistant Examiner—Morton J. Frome
Attorney—Roland A. Anderson ABSTRACT: The present dosimeter includes a cylindrical housing having an intake port at one end and an exhaust port at the opposite end. A thermoluminescent disk and a radioactivity filter are coaxially and spatially mounted with respect to each other within the housing, with the thermoluminescent disk being mounted adjacent the intake port and having an aperture therethrough coaxially aligned with the intake port. The radioactivity filter is sealed to the interior walls of the housing. A pump draws a fluid medium through the ports of the housing to effect deposition of radioactive material of the fluid medium on the radioactivity filter. Energy from the radiation emitted by the ionizing radioactive material is absorbed by the thermoluminescent disk and stored. A heat source is provided to excite the thermoluminescent disk, the emitted light intensity therefrom being a measure of the detected radiation.

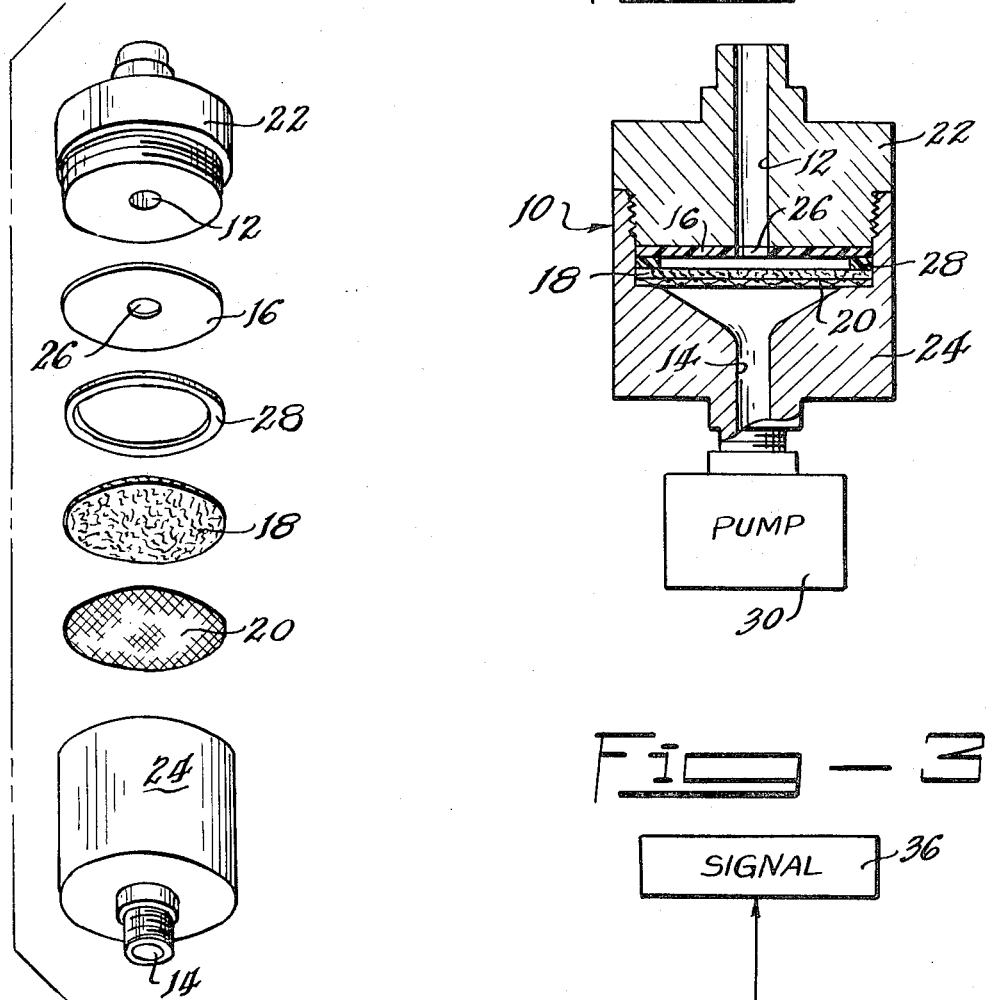

3,569,697

THERMOLUMINESCENT DOSIMETER FOR PROVIDING A TOTAL RADIATION MEASURE OF RADIO-ACTIVITY IN A FLUID MEDIUM TO WHICH THE DOSIMETER IS EXPOSED

CONTRACTUAL ORIGIN OF THE INVENTION

The invention described herein was made in the course of, or under, a contract with the United States Atomic Energy Commission.

BACKGROUND OF THE INVENTION

This invention relates to radiation measuring devices and more particularly to dosimeters for detecting radioactive matter in a fluid medium.

The noble gas, radon, which is present in the atmosphere of uranium mines, produces a chain of short-lived, nongaseous progeny which subject lung tissue to a substantial radiation dose when deposited within the human respiratory system. The realization of the hazards faced by uranium miners from inhalation of the radon daughters has resulted in government regulations limiting the allowed maximum exposure to these radon progeny.

The need to obtain exposure records for uranium miners requires the use of a personal dosimeter system which is accurate, compact, and sturdy enough to withstand conditions within a uranium mine. It is a further requirement that the dosimeter system be capable of storing the radiation dosage to which it is exposed and providing a readout of the total dosage at a later time.

It is therefore an object of this invention to provide an accurate, portable dosimeter for monitoring radioactivity in a fluid medium.

It is another object of this invention to provide an accurate, portable, and sturdy dosimeter for monitoring the concentration of radioactive radon progeny in the atmosphere of uranium mines.

It is another object of this invention to provide a portable dosimeter for monitoring the extent of radioactivity exposure incurred by uranium miners by inhalation of radioactive material in the atmosphere of uranium mines.

It is another object of this invention to provide a dosimeter for measuring the total radiation of radioactivity in a fluid medium to which the dosimeter is exposed and providing a readout of the total radiation at a later time.

SUMMARY OF THE INVENTION

In general the present invention comprises a housing including an intake and an exhaust port. Means are provided to generate a flow of the fluid being monitored through the ports and the housing. A radioactivity filter is mounted within the housing to intercept the flow of the fluid medium and a thermoluminescent member is mounted adjacent the radioactivity filter within the housing to accept emitted radiation from the filter. Means are provided for exciting the thermoluminescent member to emit light, the intensity thereof being a measure of the total radiation in the intercepted fluid medium.

BRIEF DESCRIPTION OF THE DRAWINGS

FIG. 1 is an exploded view of the apparatus for the practice of the present invention.

FIG. 2 is an assembled view of the apparatus of FIG. 1 for the practice of the present invention.

FIG. 3 is a schematic diagram of an apparatus to obtain a readout of the apparatus of FIGS. 1 and 2 according to the practice of the present invention.

DETAILED DESCRIPTION OF THE PREFERRED EMBODIMENT

Referring to FIG. 1 and FIG. 2, a housing 10 having an intake port 12 and an exhaust port 14 encloses a thermoluminescent disc 16 and a radioactivity filter 18 mounted on a rigid support mesh 20. The housing 10 includes an upper portion 22 and a lower portion 24 which are in threaded engagement. The thermoluminescent disc 16 is mounted adjacent to the intake port 12 and aligned so that an aperture 26 through the thermoluminescent disc 16 is coaxial with the intake port 12. A ring 28 separates the radioactivity filter 18 and the thermoluminescent member 16 and seals the radioactivity filter 18 to the interior walls of the housing 10. A pump 30 is attached to the exhaust port 14 of the housing 10.

Operation of the present invention is initiated by the pump 30 which generates the flow of a fluid medium through the housing 10. The medium is drawn into the housing 10 through the intake port 12 and then passes through the aperture 26 in thermoluminescent disc 16 and the filter 18 to the exhaust port 14. Radioactive material present in the fluid medium is deposited on the filter 18 and radiation energy emitted therefrom is absorbed and stored by the thermoluminescent disc 16. After irradiation of the thermoluminescent member 16, the upper and lower portions 22 and 24 of the housing 10 are separated and the thermoluminescent member 16 is removed for readout.

FIG. 3 shows a schematic diagram of the readout system for the present dosimeter. The thermoluminescent member 16 is mounted within a light tight chamber 29 on a support member 31. A heat source 32 within the chamber 29 excites the thermoluminescent member 16 which has been exposed to ionizing radiation. A light sensitive device 34 and a display means 36 coupled together, detect and record the intensity of the light emitted from the heated thermoluminescent member 16 which intensity is a measure of the total radiation in the sampled fluid medium.

The thermoluminescent member of the present dosimeter comprises a thermoluminescent material embedded in a support matrix. LiF has been or to be an acceptable thermoluminescent material but $CaSO_4$: Mn, $CaF_2$:Dy, or any other thermoluminescent material can also be used to accomplish the present invention. It is preferred that the support matrix in which the thermoluminescent material is embedded be mechanically rigid, not easily damaged, heat resistant, and chemically inert. It is further preferred that the matrix material transmit the luminescence from the LiF or other thermoluminescent material easily and not be thermoluminescent itself.

More accurate results are obtained from the present invention when the thermoluminescent disc 16 is protected from light and radiation other than that in the sampled fluid medium. This is accomplished by sizing the aperture 16 to be at least as large as the intake port 12, aligning the aperture 16 with the intake port 12 and mounting the thermoluminescent disc 16 adjacent the intake port 12 and in contact with the interior surface of the housing 10 surrounding the intake port 12.

It will be appreciated that though for the present dosimeter the spacing between the filter 18 and the thermoluminescent disc 16 effected by the ring 28 must be sufficient to permit absorption by the thermoluminescent disc 16 of radiation energy emitted by radioactive material deposited on the filter 18, the spacing should be such as to permit an even flow distribution of the fluid over the surface of the filter 18. It is also preferred that the porosity of the radioactivity filter 18 be chosen to provide optimum balance between high flow rate and negligible penetration of the radioactive material of the fluid medium into the radioactivity filter 18.

Practice of the present invention has been satisfactorily achieved with the following embodiment. A ½ inch diameter, 0.4 mm. thick thermoluminescent disc was mounted within a ½ inch internal diameter housing adjacent the intake port and in contact with the interior surface of the housing surrounding the intake port. The disc comprised LiF embedded in polytetrafluorethylene, the LiF being 28 percent by weight. A 3 millimeter diameter aperture through the center of the disc was aligned with the intake port of the housing. A 1 millimeter thick polytetrafluoroethylene ring separated the disc from the radioactivity filter and sealed the disc and the radioactivity filter to the interior walls of the housing. The filter was a 0.65 porosity membrane supported by a wire mesh. The pump generated the flow of the fluid medium through the housing at a rate of 0.5 liter per minute.

The heating cycle for the LiF discs included heating the disc to a temperature of 260° in 15 seconds and maintaining the disc at this temperature for 45 seconds. The LiF discs were found to be reusable if annealed properly after each irradiation and readout. An annealing at 300° C. for 15 minutes removed all residual thermoluminescence not read out previously.

It has been found that a dosimeter constructed according to the aforedescribed teaching provides a sturdy portable dosimeter which is capable of accurately measuring within the 7 percent the concentration of radon progeny in the atmosphere.

While specific examples of the invention have been set forth herein, it is not intended the invention be limited solely thereto, but to include all of the variations and modifications falling within the scope of the following claims.

I claim:

1. A dosimeter for providing a total radiation measure of radioactivity in a fluid medium to which the dosimeter is exposed comprising an elongated housing including an intake port and an exhaust port axially mounted with respect to each other at opposite ends thereof, means for generating a flow of said fluid medium through said ports and housing, a thermoluminescent member mounted within said housing to said intake port end and including an aperture therethrough sized and aligned with respect to said intake port to permit the passage of said liquid medium, a radioactivity filter mounted within said housing in sealed engagement with the interior walls thereof to accept fluid medium flow from the aperture of said thermoluminescent member, said radioactivity filter being spaced from and oriented with respect to said thermoluminescent member to effect an even distribution of fluid medium flow over said filter and radiation coupling between said thermoluminescent member and said radioactivity filter, and means for exciting said thermoluminescent member causing light emission therefrom, which light emission is a total radiation measure of the radioactivity in the coupled fluid medium.

2. The apparatus as defined in claim 1 wherein said thermoluminescent member comprises a thermoluminescent material embedded in a matrix material.

3. The apparatus as defined in claim 2 wherein the thermoluminescent member is a disc comprising LiF embedded in a polytetrafluorethylene matrix.